United States Patent [19]

Shpater

[11] Patent Number: 5,751,803
[45] Date of Patent: May 12, 1998

[54] TELEPHONE LINE COUPLER

[75] Inventor: Pinhas Shpater, Quebec, Canada

[73] Assignee: Shmuel Hershkovit, Quebec, Canada

[21] Appl. No.: 555,042

[22] Filed: Nov. 8, 1995

[51] Int. Cl.$^6$ .................................................. H04M 1/00
[52] U.S. Cl. ........................... 379/379; 379/373; 379/399; 379/412
[58] Field of Search ........................ 379/379, 377, 379/382, 372, 373, 387, 399, 412, 413, 442, 443, 418, 252, 163

[56] References Cited

U.S. PATENT DOCUMENTS

| | | | |
|---|---|---|---|
| 3,829,619 | 8/1974 | Close et al. | 379/379 |
| 3,941,939 | 3/1976 | Holmes et al. | 379/252 |
| 4,056,719 | 11/1977 | Waaben | 379/344 X |
| 4,101,741 | 7/1978 | Kunstatter | 379/163 |
| 4,203,006 | 5/1980 | Mascia | 379/443 |
| 4,282,604 | 8/1981 | Jefferson | 359/153 |
| 4,292,466 | 9/1981 | Eckel | 379/109 X |
| 4,417,099 | 11/1983 | Pierce | 379/98 |
| 4,436,960 | 3/1984 | Harmon, Jr. | 379/379 X |
| 4,558,183 | 12/1985 | Corris et al. | 379/379 X |
| 4,723,267 | 2/1988 | Jones et al. | 379/93 |
| 4,727,535 | 2/1988 | Brandt | 359/113 |
| 4,803,719 | 2/1989 | Ulrich | 379/399 |
| 5,140,631 | 8/1992 | Stahl | 379/379 X |
| 5,233,649 | 8/1993 | Guerra, Jr. | 379/372 |
| 5,555,293 | 9/1996 | Krause | 379/399 X |

*Primary Examiner*—Jack Chiang
*Attorney, Agent, or Firm*—Michael D. Bednarek; Kilpatrick Stockton LLP

[57] ABSTRACT

The telephone line coupler circuit has a single transmit opto-coupler whose output includes a DC bias component connected to a gate of a line seize switch for connecting a DC line seize load across the ring and tip contacts of the telephone line. The line seize switch is saturated by the transmit opto-coupler bias output and the AC component of the transmit opto-coupler output is sent over the telephone lines. The receive opto-coupler is used both for receiving communications signal and for detecting the ring signal. The band pass filter connected to the output of the receive opto-coupler may be switched to pass a ring signal frequency band or a communications frequency band. The circuit operates using two opto-coupler devices while conventional circuits require four opto-coupler devices.

4 Claims, 1 Drawing Sheet

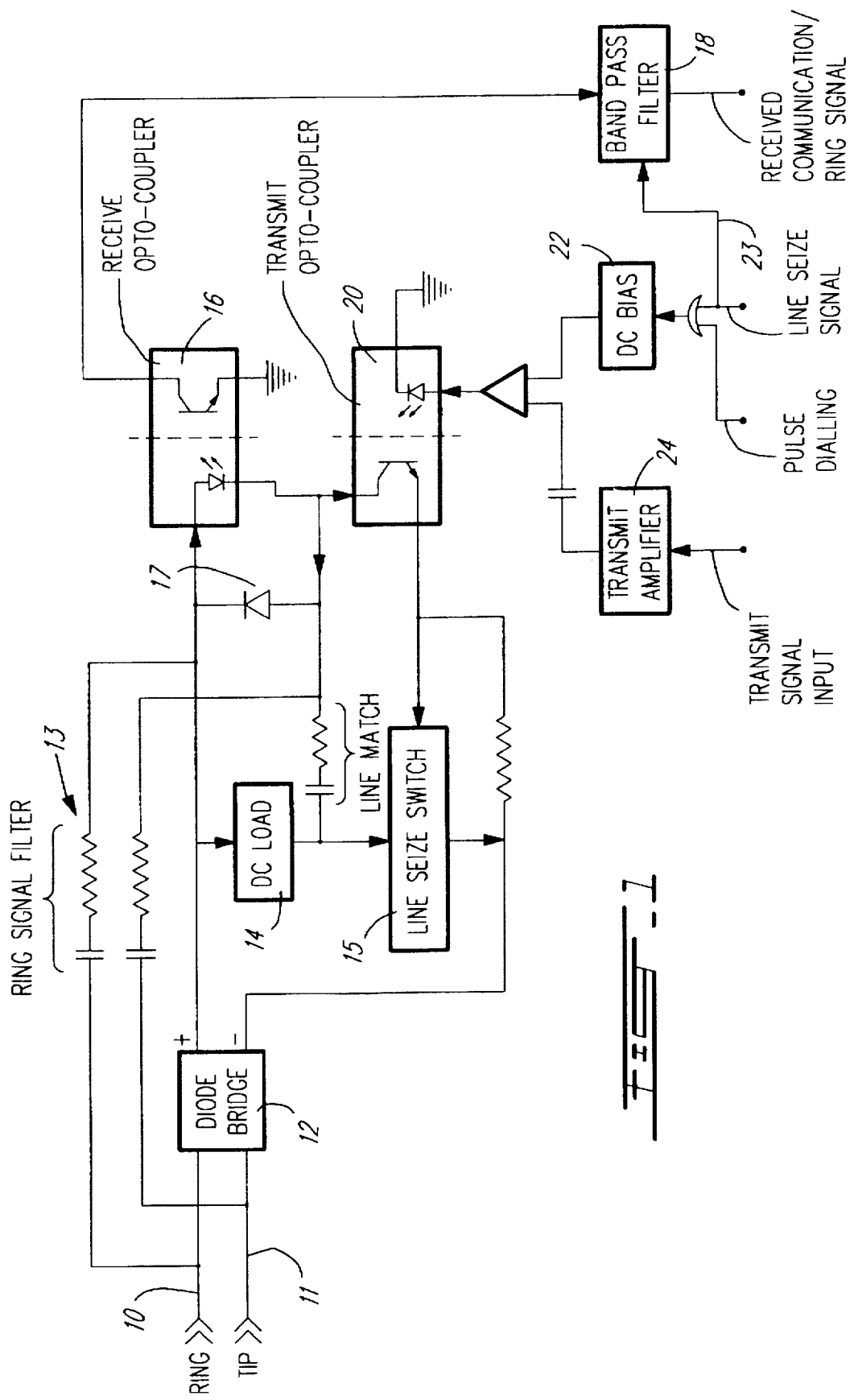

TELEPHONE LINE COUPLER

FIELD OF THE INVENTION

The present invention relates to a telephone line coupler circuit for connecting telephone subscriber equipment to a telephone line.

BACKGROUND OF THE INVENTION

A telephone line coupler circuit is found in most every type of electronic equipment connected to a telephone line such as modems and fax machines. In order to protect the electronic equipment from surges on the telephone line and side to prevent different ground voltages from causing erroneous operation in the subscriber equipment, transformers or opto-couplers are used in the coupler circuit to connect the subscriber electronic equipment for the telephone line.

Coupler circuits which use opto-couplers are known in the art. In U.S. Pat. No. 4,727,535 to Brandt, a coupler circuit is described in which a single opto-coupler is used for relaying the analog AC transmit signal and another opto-coupler device is used for relaying the received AC signal. The telephone line connect and disconnect circuit (e.g. a line relay) is not disclosed. In U.S. Pat. No. 4,203,006 to Mascia, one opto-coupler is used for relaying a ringing signal to a modem, a second opto-coupler is used in relaying a line seize signal from the modem to the telephone line access coupler and a transformer is used in place of a pair of opto-couplers for relaying the received and transmitted AC signals from the coupler to the modem.

In the known prior art coupler circuits using opto-couplers, the basic functions of relaying the ring signal, relaying the communications receive signal, relaying the line seize signal and relaying the AC transmit signal all require separate opto-coupler devices. In the case that a transformer used, the bi-directional nature of the transformer allows for single device to be used for relaying the received and the transmitted communication signal. In a standard telephone line coupler circuit, the cost of the opto-coupler devices is a substantial portion of the component cost for the circuit.

SUMMARY OF THE INVENTION

It is accordingly an object of the present invention to provide a telephone line coupler circuit for coupling a telephone line to a subscriber electronic device with isolation between the telephone line and the subscriber device in which the number of opto-couplers is reduced.

In accordance with the first aspect of the present invention, there is provided a telephone line coupler circuit for connecting telephone subscriber equipment to a telephone line, the circuit comprising: ring and tip connector means for connecting to telephone line ring and tip contacts and providing ring and tip signal outputs; a high impedance DC load and a gated line switch connected in series between the ring and tip signal outputs for controllably conducting an "off-hook" current between the ring and tip signal outputs; a transmit opto-coupler means having a transmit signal input and output; means connecting the output terminal to the tip output and to a gate input of the gated line switch; means for controllably providing a low level DC bias signal to the transmit signal input and generating sufficient current on the output to substantially saturate the gated line switch and seize the line; means for providing an outgoing AC signal to the transmit signal input; and AC signal receive means connected to the ring and tip outputs for detecting an incoming AC signal and producing an incoming AC signal output.

The invention also provides a telephone line coupler circuit for connecting telephone subscriber equipment to a telephone line, the circuit comprising: ring and tip connector means for connecting to telephone line ring and tip contacts and providing ring and tip signal outputs; a high impedance DC load and a line switch connected in series between the ring and tip signal outputs for controllably conducting an "off-hook" current between the ring and tip signal outputs; signal transmit means having a transmit signal input and being connected to the ring and tip outputs for transmitting AC signal; AC communications signal receive means connected to the ring and tip outputs for detecting an incoming AC communications signal and producing an incoming AC communications signal output; and AC ring signal detect means connected to the ring and tip outputs for detecting a telephone ring signal on the telephone line and generating a ringing output signal; wherein: the AC communications signal receive means and the AC ring signal detect means share a common receive opto-coupler device.

Preferably, the AC communication signal receive means and the AC ring signal detect means comprise a single band pass amplifier circuit which is switchable between two frequency bands, that is a first frequency band for the telephone ring signal and a second frequency band for received communication signals. Also preferably, the band pass filter amplifier is switched between the ring frequency band to the communications frequency band by the line seize signal connected to the means for controllably providing a load level DC bias signal to the transmit signal input of the transmit opto-coupler means.

Accordingly, the invention also provides a telephone line coupler circuit for connecting telephone subscriber equipment to a telephone line, the circuit comprising: ring and tip connector means for connecting to telephone line ring and tip contacts and providing ring and tip signal outputs; a high impedance DC load and a gated line switch connected in series between the ring and tip signal outputs for controllably conducting an "off-hook" current between the ring and tip signal outputs; a transmit opto-coupler means having a transmit signal input and output; means connecting the output terminal to the tip output and to a gate input of the gated line switch; means for controllably providing a low level DC bias signal to the transmit signal input and generating sufficient current on the output to substantially saturate the gated line switch and seize the line; means for providing an outgoing AC signal to the transmit signal input; AC communications signal receive means connected to the ring and tip outputs for detecting an incoming AC communications signal and producing an incoming AC communications signal output; and AC ring signal detect means connected to the ring and tip outputs for detecting a telephone ring signal on the telephone line and generating a ringing output signal; wherein: the AC communications signal receive means and the AC ring signal detect means share a common receive opto-coupler device.

BRIEF DESCRIPTION OF THE DRAWING

The invention will be better understood by way of the following detailed description of a preferred embodiment with reference to the appended drawing in which:

FIG. 1 is a block diagram of the telephone line coupler circuit according to the preferred embodiment.

DETAILED DESCRIPTION OF THE PREFERRED EMBODIMENT

In the preferred embodiment as illustrated in FIG. 1, the telephone line coupler circuit according to the invention comprises a telephone line ring/tip connector providing ring and tip outputs 10 and 11 respectively. In the case that the polarity may be reversed by the telephone company, a diode bridge 12 is provided for providing the correct polarity to the rest of the circuit. A receive opto-coupler 16 is connected to the positive ring output of the diode bridge 12 through a capacitor and line seize switch 15 to the negative tip output of bridge 12. A DC line seize load 14 and a line seize switch 15 are connected in series between the ring and tip outputs of bridge 12. In order to seize the telephone line, a small DC current must pass through the coupler circuit in order for the telephone company central office equipment to consider the line to be in use.

A transmit opto-coupler 20 has an input consisting of a DC bias signal from a DC bias source 22 and an AC signal component coming from transmit amplifier 24. A comparator circuit is used to block the AC signal in the absence of the DC bias signal and to allow the DC bias signal to pass through in the absence of the AC signal. When the line seize signal 23 is energized, the DC bias voltage from 22 causes the transmit opto-coupler to output a base DC level which saturates the line seize switch 15 to provide the minimum required DC current through load 14 to seize the line. The DC bias level is chosen to provide a sufficient output to saturate line seize switch even when the AC component from transmit amplifier 24 is superimposed. The AC output from opto-coupler 20 is also fed through a resistance directly to the tip output of bridge 12. For pulse dialling, a separate pulse dialling input is provided which is ORed with line seize signal 23.

When the circuit is in the "on-hook" state, line seize signal 23 is low and the band pass filter amplifier 18 is set to amplify AC signals in a frequency range of the telephone ring signal. Current from outputs 10 and 11 corresponding to a ring signal pass through ring signal filter 13 across the receive opto-coupler 16. Return current passes through diode 17. The received communication/ring signal output from amplifier 18 produces an AC output corresponding to the ring signal appearing on outputs 10 and 11. The subscriber device connected to the output of amplifier 18 detects the presence of the ring signal and upon deciding to answer, places an output on line seize signal line 23 resulting in amplifier 18 switching to filtering and amplifying frequencies in the communication band and resulting in DC bias source 22 providing a DC bias signal to transmit opto-coupler 20 which causes the line seize switch 15 to be saturated and the line to be seized by passing the required DC current through load 14. Since the receive opto-coupler 16 is connected to the transmit opto-coupler 20, a minimum draw of current to place the light-emitting diode of receive opto-coupler 16 in an operational range is achieved. As an AC signal comes into receive opto-coupler 16, a faithful isolated AC output is generated.

As can be appreciated, the line coupler circuit according to the invention requires only two opto-coupler devices for the purposes of relaying ring signal, communication signal, transmission and seizing the telephone line. While in the preferred embodiment, the band pass filter amplifier 18 is shown as a single block circuit having a single output, it is of course possible to provide two separate filter/amplifier circuits connected to the output of opto-coupler 16 without requiring a connection to line seize signal line 23 to switch between the two filters.

I claim:

1. A telephone line coupler circuit for connecting telephone subscriber equipment to a telephone line, the circuit comprising:

ring and tip connector means for connecting to telephone line ring and tip contacts and providing ring and tip signal outputs;

a high impedance DC load and a gated line switch connected in series between said ring and tip signal outputs for controllably conducting an "off-hook" current between said ring and tip signal outputs;

a transmit opto-coupler means having a transmit signal input and output;

means for connecting said transmit signal output to said tip output and to a gate input of said gated line switch;

means for controllably providing a low level DC bias signal to said transmit signal input and generating sufficient current on said transmit signal output to substantially saturate said gated line switch and seize said telephone line;

means for providing an outgoing AC signal to said transmit signal input; and

AC signal receive means connected to said ring and tip outputs for detecting an incoming AC signal and producing an incoming AC signal output.

2. A telephone line coupler circuit for connecting telephone subscriber equipment to a telephone line, the circuit comprising:

ring and tip connector means for connecting to telephone line ring and tip contacts and providing ring and tip signal outputs;

a high impedance DC load and a gated line switch connected in series between said ring and tip signal outputs for controllably conducting an "off-hook" current between said ring and tip signal outputs;

a transmit opto-coupler means having a transmit signal input and output;

means for connecting said transmit signal output to said tip output and to a gate input of said gated line switch;

means for controllably providing a low level DC bias signal to said transmit signal input and generating sufficient current on said transmit signal output to substantially saturate said gated line switch and seize said telephone line;

means for providing an outgoing AC signal to said transmit signal input;

AC communications signal receive means connected to said ring and tip outputs for detecting an incoming AC communications signal and producing an incoming AC communications signal output; and AC ring signal detect means connected to said ring and tip outputs for detecting a telephone ring signal on said telephone line and generating a ringing output signal; wherein:

said AC communications signal receive means and said AC ring signal detect means share a common receive opto-coupler device.

3. A telephone line coupler circuit for connecting telephone subscriber equipment to a telephone line, the circuit comprising:

ring and tip connector means for connecting to telephone line ring and tip contacts and providing ring and tip signal outputs;

a high impedance DC load and a line switch connected in series between said ring and tip signal outputs for controllably conducting an "off-hook" current between said ring and tip signal outputs;

signal transmit means having a transmit signal input and being connected to said ring and tip outputs for transmitting AC signal;

AC communications signal receive means connected to said ring and tip outputs for detecting an incoming AC communications signal and producing an incoming AC communications signal output; and AC ring signal detect means connected to said ring and tip outputs for detecting a telephone ring signal on said telephone line and generating a ringing output signal;

wherein said AC communication signal receive means and said AC ring signal detect means share a common receive opto-coupler device and a common band pass filter circuit switchable between a frequency band of said ring signal and a frequency band of communications signal received over said telephone line, a switching of said filter circuit being in response to a control signal for said line switch.

4. A telephone line coupler circuit for connecting telephone subscriber equipment to a telephone line, the circuit comprising:

ring and tip connector means for connecting to telephone line ring and tip contacts and providing ring and ti-p signal outputs;

a high impedance DC load and a gated line switch connected in series between said ring and tip signal outputs for controllably conducting an "off-hook" current between said ring and tip signal outputs;

a transmit opto-coupler means having a transmit signal input and output;

means connecting said transmit signal output to said tip output and to a gate input of said gated line switch;

means for controllably providing a low level DC bias signal to said transmit signal input and generating sufficient current on said transmit signal output to substantially saturate said gated line switch and seize said line;

means for providing an outgoing AC signal to said transmit signal input;

AC communications signal receive means connected to said ring and tip outputs for detecting an incoming AC communications signal and producing an incoming AC communications signal output; and AC ring signal detect means connected to said ring and tip outputs for detecting a telephone ring signal on said telephone line and generating a ringing output signal;

wherein said AC communications signal receive means and said AC ring signal detect means share a common receive opto-coupler device and include a shared band pass filter circuit switchable between a ring signal frequency band and a communication signal frequency band, said filter circuit being switched by a line seize signal fed to said low level DC bias signal providing means.

* * * * *